United States Patent [19]
Ueda

[11] Patent Number: 5,548,336
[45] Date of Patent: Aug. 20, 1996

[54] VIDEO CODE CONVERSION WITH AN OPTIMUM CONVERSION SPEED WHICH MATCHES A REPRODUCTION SPEED OF A REPRODUCING UNIT

[75] Inventor: Hiroaki Ueda, Tokyo, Japan

[73] Assignee: NEC Corporation, Tokyo, Japan

[21] Appl. No.: 350,111

[22] Filed: Nov. 29, 1994

[30] Foreign Application Priority Data

Nov. 29, 1993 [JP] Japan ............................. 5-297896

[51] Int. Cl.[6] .................................................. H04N 7/26
[52] U.S. Cl. ..................... 348/384; 348/403; 382/233; 382/248; 358/335
[58] Field of Search ................................ 348/384, 390, 348/403, 424, 425, 392, 404; 382/232, 233, 235, 248, 250; 358/342, 335, 312; 360/10.1

[56] References Cited

U.S. PATENT DOCUMENTS

| | | | |
|---|---|---|---|
| 5,134,487 | 7/1992 | Taguchi et al. | 348/384 |
| 5,189,526 | 2/1993 | Sasson | 348/403 |
| 5,251,029 | 10/1993 | Enari et al. | 358/133 |
| 5,287,420 | 2/1994 | Barrett | 348/384 |
| 5,333,013 | 7/1994 | Enari et al. | 348/405 |
| 5,384,598 | 1/1995 | Rodriguez et al. | 348/384 |

FOREIGN PATENT DOCUMENTS

| | | |
|---|---|---|
| 4-167868 | 6/1992 | Japan . |
| 4-341063 | 11/1992 | Japan . |
| 4-343578 | 11/1992 | Japan . |
| 4-341065 | 11/1992 | Japan . |

Primary Examiner—Howard W. Britton
Assistant Examiner—A. Au
Attorney, Agent, or Firm—Foley & Lardner

[57] ABSTRACT

In a device which is supplied with a compression coded signal given by subjecting an original video signal to differential coding and which includes a converting section (10, 8, 7, 6) for carrying out a converting operation of converting the compression coded signal into a DCT coded signal identical with a coded signal given by subjecting the original video signal to DCT coding, a timer (3) measures a total time interval as a measured time interval until a reproducing unit (20) finishes reproducing from the DCT coded signal a leading frame of the original video signal from a time instant at which the converting section starts the converting operation. A subsampling information producing circuit (13) produces optimum subsampling information with reference to the measured time interval to make the converting section carry out an optimum subsampled converting operation of converting remaining frames of the compression coded signal into the DCT coded signal in accordance with the optimum subsampling information. Preferably, the subsampling information producing circuit compares the measured time interval with a predetermined time interval and produces, when the measured time interval is greater than the predetermined time interval, first subsampling information as the optimum subsampling information to make the converting section carry out a simplified subsampled converting operation as the optimum subsampled converting operation in accordance with the first subsampling information.

11 Claims, 16 Drawing Sheets

| 1 | 3 | 5 | 7 | 9 | 11 | 13 | 15 |
|---|---|---|---|---|---|---|---|
| 2 | 4 | 6 | 8 | 10 | 12 | 14 | 16 |
| 17 | 19 | 21 | 23 | 25 | 27 | 29 | 31 |
| 18 | 20 | 22 | 24 | 26 | 28 | 30 | 32 |
| 33 | 35 | 37 | 39 | 41 | 43 | 45 | 47 |
| 34 | 36 | 38 | 40 | 42 | 44 | 46 | 48 |
| 49 | 51 | 53 | 55 | 57 | 59 | 61 | 63 |
| 50 | 52 | 54 | 56 | 58 | 60 | 62 | 64 |

FIG. 4
PRIOR ART

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 5
PRIOR ART

VIDEO CODE CONVERSION WITH AN OPTIMUM CONVERSION SPEED WHICH MATCHES A REPRODUCTION SPEED OF A REPRODUCING UNIT

BACKGROUND OF THE INVENTION

This invention relates to a video conversion device supplied with a compression coded signal given by subjecting an original video signal to differential coding. The video code conversion device is for converting the compression coded signal into a DCT (discrete cosine transform) coded signal identical with a coded signal given by subjecting the original video signal to DCT coding. The video code conversion device is for use in combination with a reproducing unit which reproduces the original video signal from the DCT coded signal.

When an image is digitized and recorded in a recording medium such as a CD-ROM (Compact Disk Read Only Memory) and a hard disk, the image is generally compressed into a compressed signal to be recorded so that an amount of produced data is not enormously large.

Among various compression coding systems, a DCT coding system is frequently used and is adopted in an international standard coding system such as JPEG (Joint Photographic Expert Group) and MPEG (Moving Pictures Expert Group). The DCT coding system produces a DCT coded signal given by subjecting an original video signal to DCT coding. A differential coding system, in which processing is relatively simple, is also frequently used although it is not an international standard. The differential coding system produces a compression coded signal given by subjecting the original video signal to differential coding.

Thus, there are international standards such as the JPEG and the MPEG as the DCT coding system. Accordingly, reproduction is possible by any reproducing unit which is based on the international standard. However, inverse DCT or inverse quantization processing imposes a large load upon a CPU (central processing unit). This means that high-speed reproduction can not be carried out unless the CPU is operable at a high speed. On the other hand, in the differential coding system, the load imposed upon the CPU is small because calculation of the differential values alone is required. Even with a low-speed CPU, high-speed reproduction is possible. However, there are many kinds of differential coding systems because no standard exists. This means that reproduction can not be carried out unless a specific reproducing unit specific to each system is used.

Instead of providing such a specific reproducing unit for each of various differential coding systems, it is proposed to transform the compression coded signal representative of differential codes into the DCT coded signal representative of DCT codes so that reproduction is carried out by a standard reproducing unit which reproduces the original video signal from the DCT coded signal given by the JPEG and the MPEG.

In such a device, it is necessary to expand the compression coded signal into an expanded signal (namely, the original video signal) at a high speed and then to compress the original video signal into the DCT coded signal at a high speed. If the CPU has a low processing speed and high-speed conversion is impossible, the image can not be reproduced in realtime. For example, it is assumed that the JPEG or the MPEG reproducing unit requires 20 milliseconds for reproduction of one frame. In this event, code conversion of one frame must be carried out within about 46 milliseconds in order to achieve a processing rate of 15 frames per second. If expansion of the compression coded signal into the original video signal requires 10 milliseconds and compression of the original video signal into the DCT coded signal requires 50 milliseconds, a code conversion processing time is equal to 60 milliseconds. Thus, a delay of 14 milliseconds is caused upon reproduction of the image of one frame.

In order to carry out the code conversion at a high speed, it is necessary to control an amount of the compression codes in the DCT coding system. A conventional technique is disclosed in Japanese Patent Unexamined Publications Nos. 167868/1992 and 343578/1992. In the disclosed systems, high-speed video compression is achieved by interrupting variable-length coding so as not to exceed the amount of codes assigned to each block. On the other hand, Japanese Patent Unexamined Publications Nos. 341063/1992 and 341065/1992 disclose the systems in which a plurality of quantization processings are carried out in parallel and an optimum one is coded. Thus, high-speed video compression is achieved.

In the above-mentioned video compression, it is possible to control the amount of the compression codes. However, such control is not carried out in specific concern to the processing ability of the reproducing unit. Accordingly, realtime reproduction is impossible with the reproducing unit having a low processing speed. On the other hand, a high-speed reproducing unit is allowed to reproduce no other codes than those having a predetermined picture quality although it has an ability of reproducing high-quality codes.

SUMMARY OF THE INVENTION

It is therefore an object of this invention to provide a video code conversion device capable of carrying out code conversion at an optimum conversion speed which matches a reproduction speed of a reproducing unit.

It is another object of this invention to provide a video code conversion device of the type described, which has a simple structure.

Other objects of this invention will become clear as the description proceeds.

On describing the gist of this invention, it is possible to understand that a video code conversion device is supplied with a compression coded signal given by subjecting an original video signal comprising a predetermined number of frames to differential coding. The device includes converting means for carrying out a converting operation of converting the compression coded signal into a DCT coded signal identical with a coded signal given by subjecting the original video signal to DCT coding. The video code conversion device is for use in combination with a reproducing unit for carrying out a reproducing operation of reproducing the original video signal from the DCT coded signal.

According to this invention, the above-understood device comprises: measuring means for measuring a total time interval as a measured time interval until the reproducing unit finishes the reproducing operation for a leading one of the frames of the original video signal from a time instant at which the converting means starts the converting operation; and subsampling information producing means for producing optimum subsampling information with reference to the measured time interval to make the converting means carry out an optimum subsampled converting operation of converting remaining ones of the frames of the compression coded signal into the DCT coded signal in accordance with the optimum subsampling information.

BRIEF DESCRIPTION OF THE DRAWING

FIG. 4 is a view for use in describing an order of coding in the DCT coding system of FIG. 1;

FIG. 5 is a view for use in describing an order of coding in the differential coding system of FIG. 2;

DESCRIPTION OF THE PREFERRED EMBODIMENT

Figure 1:
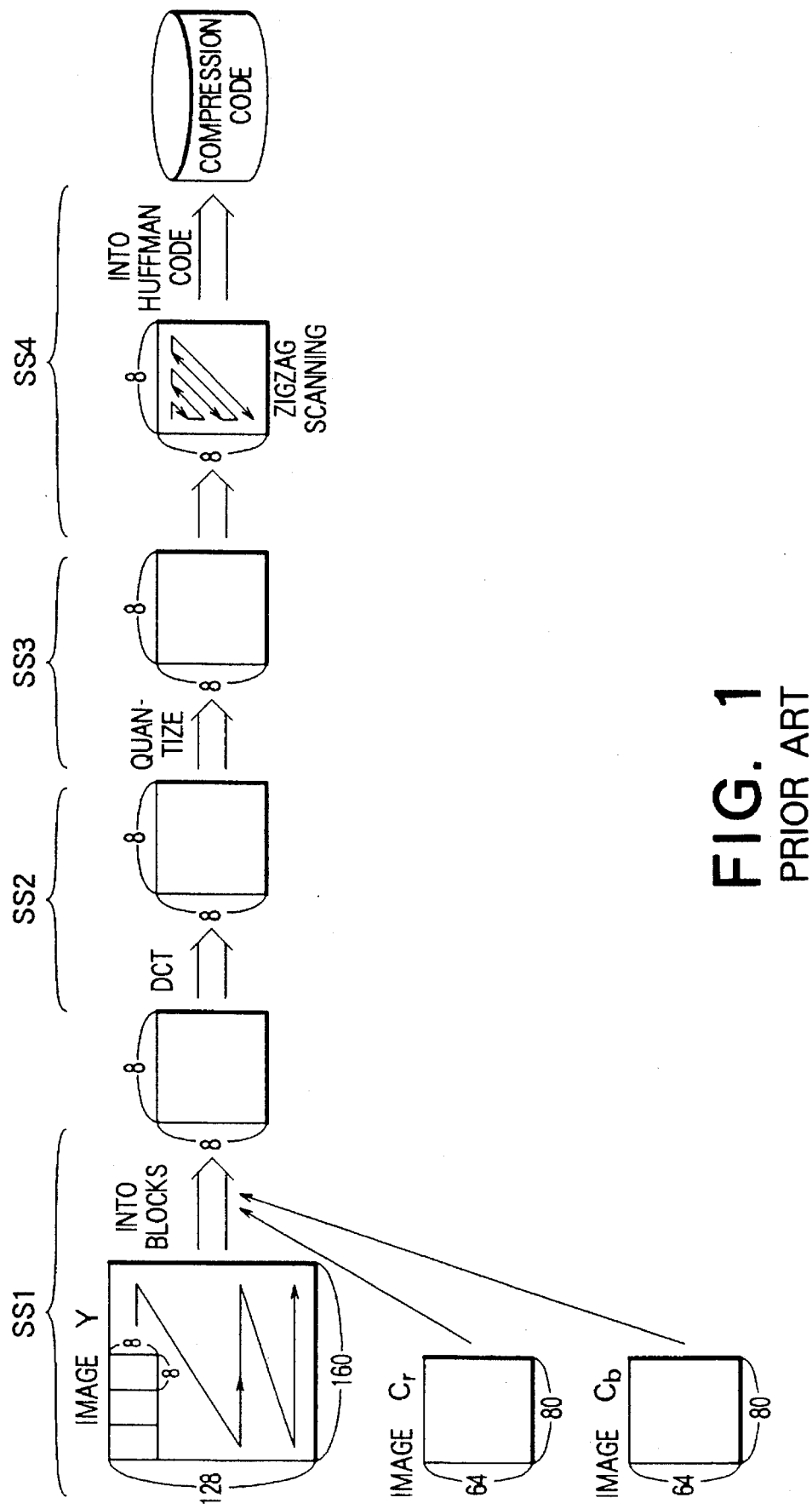
FIG. 1 is a flow chart for use in describing operation of a conventional DCT coding system.

Referring to FIG. 1, description will be made as regards video compression in a conventional DCT coding system. In the DCT coding system, compression is carried out utilizing the fact that video information is concentrated to low frequency components when the image is converted into frequency components. The image separated into a luminance or brightness Y and chrominances or color differences Cr and Cb is divided into blocks each having a size of 8×8 picture elements (step SS1). Each block is subjected to two-dimensional DCT as orthogonal transformation (step SS2) and stored or collected into a block of an 8×8 size. Being subjected to DCT, the image data is transformed into spatial frequency components, namely, a direct current component DC, and an alternating current component AC. Then, the data stored in the block of an 8×8 size are divided by a quantization coefficient for each frequency component (step SS3) into a quantized value. The quantized value is subjected to Huffman coding which is variable-length coding (step SS4). In the Huffman coding, the DC component is at first coded and then the AC component is coded. At this time, scanning from a low frequency component to a high frequency component, which is called zigzag scanning, is carried out. The number (the number of runs of zero) of consecutive invalid components (having a level 0) and a value of a next following valid component are collectively subjected to Huffman coding as a single group.

Figure 2:
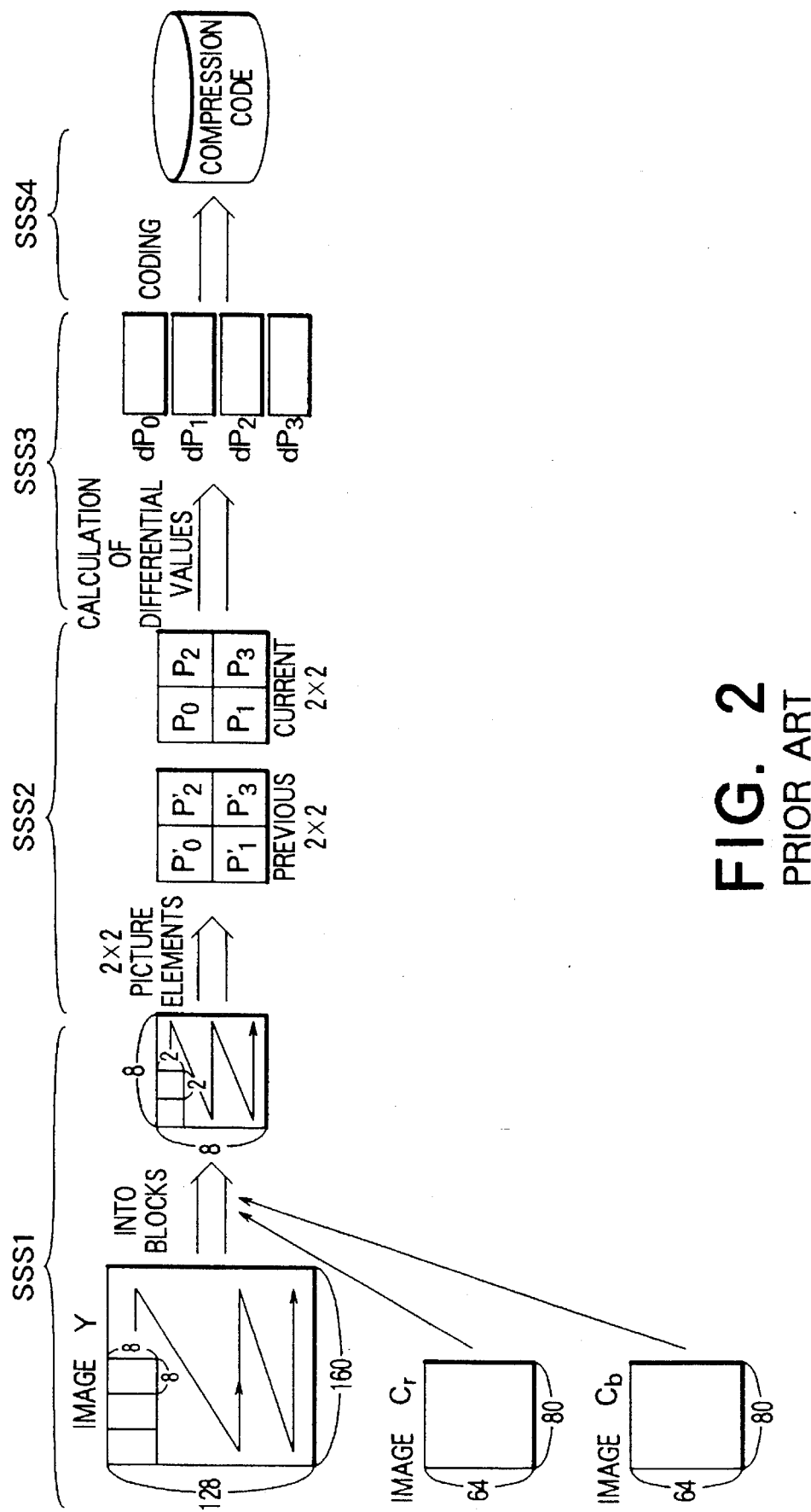
FIG. 2 is a flow chart for use in describing operation of a conventional differential coding system.

Turning to FIG. 2, description will proceed to video compression in a conventional differential coding system. In the differential coding system, compression is carried out utilizing the fact that a differential value between adjacent picture elements is concentrated to zero. The image separated into the luminance or the brightness Y and the chrominances or the color differences Cr and Cb is divided into blocks each having an 8×8 size (step SSS1). Each block is further divided into blocks of a 2×2 size (step SSS2). Differential values between picture elements are calculated (step SSS3). In the step SSS3, calculation is made of a differential value ($dP0=P0-P'3$) between a lower right picture element (P'3) in a previous block of a 2×2 size and an upper left picture element (P0) in a current block of a 2×2 size, a differential value ($dP1=P1-P0$) between a lower left picture element (P1) and the upper left picture element (P0), a differential value ($dP2=P2-P1$) between an upper right picture element (P2) and the lower left picture element (P1), and a differential value ($dP3=P3-P2$) between a lower left picture element (P3) and the upper right picture element (P2). Next, the differential values are subjected to variable-length coding (step SSS4).

Figure 3:
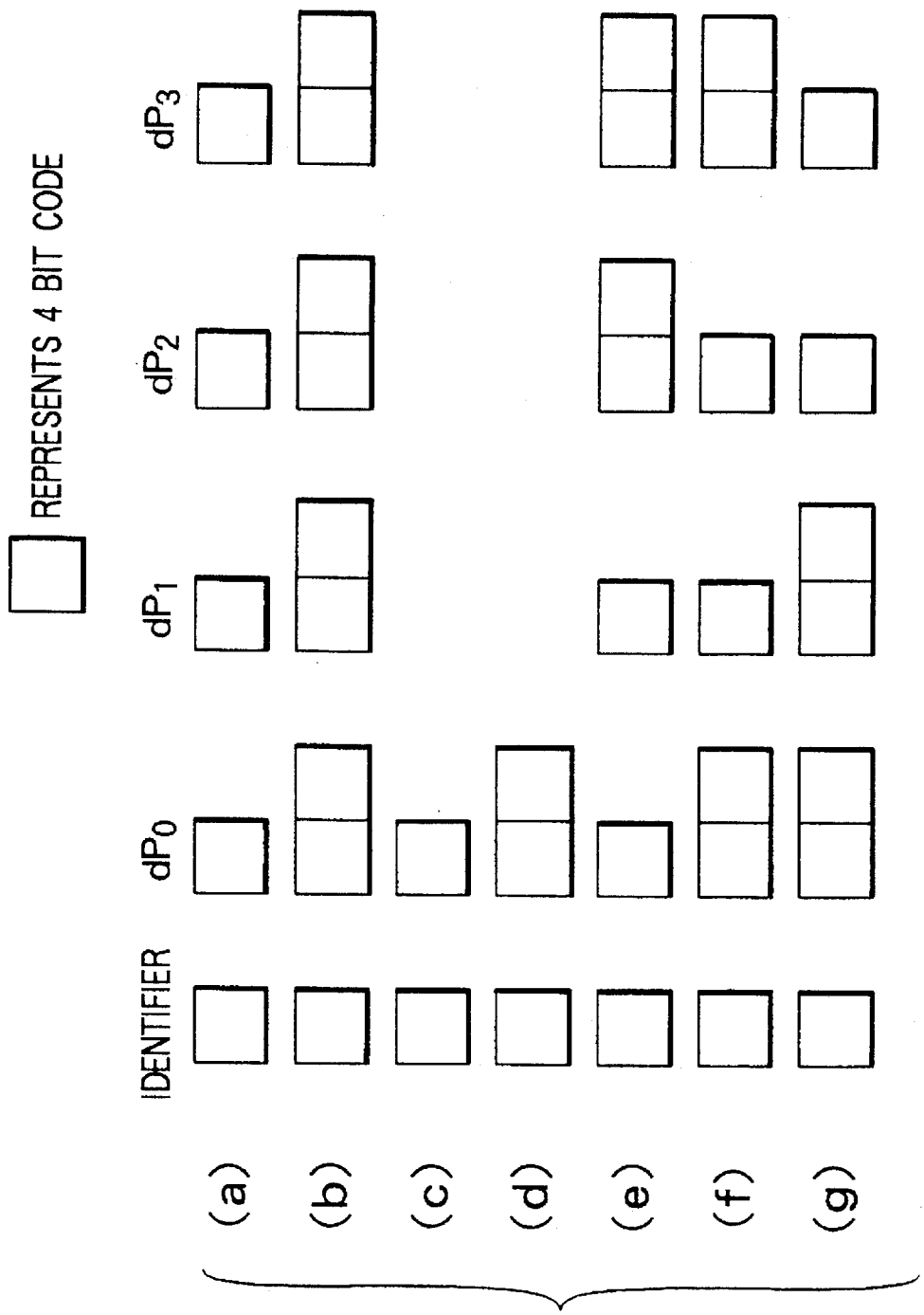
FIG. 3 is a view for use in describing a coding step SSS4 of FIG. 2.

Turning to FIG. 3, the variable-length coding is carried out separately for a first case (a) where the differential values for all of the four picture elements are not greater than 4 bits, for a second case (b) where the differential values for all of the four picture elements exceed 4 bits, for a third case (c) where the four picture elements have a same value and the differential values are not greater than 4 bits, for a fourth case (d) where the four picture elements have a same value and the differential values exceed 4 bits, for a fifth case (e) where the differential values dP0 and dP1 alone are not greater than 4 bits, for a sixth case (f) where the differential values dP1 and dP2 alone are not greater than 4 bits, and for a seventh case (q) where the differential values dP2 and dP3 alone are not greater than 4 bits.

Turning to FIG. 4, illustration is made of an order of coding of the block of an 8×8 size in the differential coding system. In the differential coding system, coding is carried out for each block of a 2×2 size in the manner described above.

Turning to FIG. 5, illustration is made of another order of coding of the block of an 8×8 size in the DCT coding system. In the DCT coding system, coding is carried out in zigzag scanning from the low frequency component to the high frequency components as also mentioned above.

In the differential coding system of FIG. 2, the differential values are coded for each block of a 2×2 size. It is also possible to carry out coding for each block of either a 4×4 size or an 8×8 size. Although a four bit code is assigned as the variable-length code in FIG. 3, the variable-length code between 2 and 16 bits long may be assigned.

Figure 6:
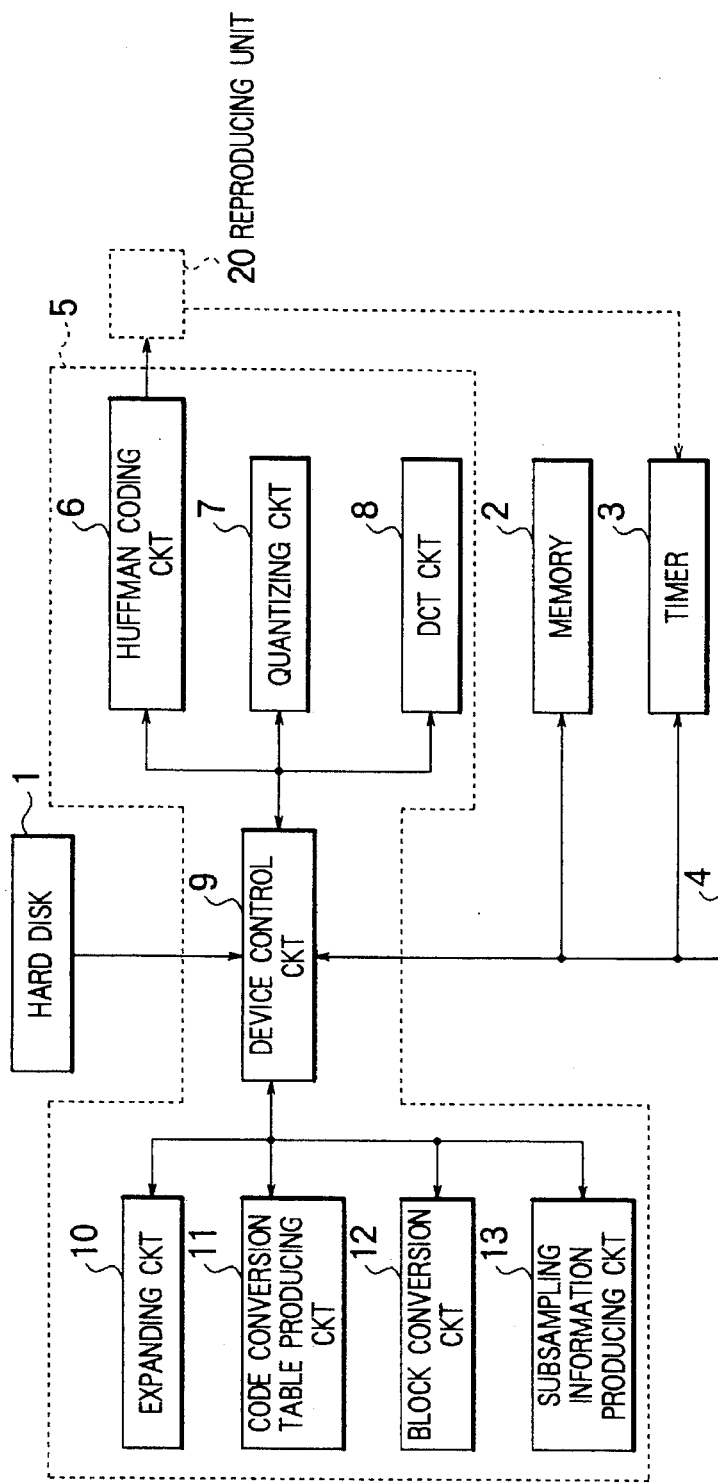
FIG. 6 is a block diagram of a video conversion device according to an embodiment of this invention.

Turning to FIG. 6, description will be made as regards a video code conversion device according to a preferred embodiment of this invention. The video code conversion device comprises a hard disk 1, a memory 2, a timer 3, a keyboard 4, and a control unit 5. The control unit 5 comprises a Huffman coding circuit 6, a quantizing circuit 7, a DCT circuit 8, a device control circuit 9, an expanding circuit 10, a code conversion table producing circuit 11, a block conversion circuit 12, and a subsampling information producing circuit 13. Processing of the video code conversion device is specified by an input through the keyboard 4 so that the control unit 5 controls the entire device. A differential code recorded in the hard disk 1 is stored in the memory 2. The differential code stored is expanded by the expanding circuit 10 for an image of an 8×8 size, DCT processed by the DCT circuit 8, quantized by the quantizing circuit 7, and subjected to variable-length coding by the Huffman-coding circuit 6 to produce a DCT code which is delivered to a reproducing unit 20 for display of the image. At this time, the timer 3 monitors a code conversion processing time and a processing time of the reproducing unit 20. The subsampling information producing circuit 13 calculates subsampling information for code conversion in dependence upon a processing speed of the reproducing unit 20. In accordance with the subsampling information, compression processing in the DCT circuit 8, the quantizing circuit 7, and the Huffman coding circuit 6 is simplified to carry out compression at a high speed. The code conversion table producing circuit 11 prepares, from those codes before and after conversion, a conversion table to be stored in the memory 2. The block conversion circuit 12 converts a code corresponding to a previously converted code at a high speed with reference to the block conversion table thus stored.

Figure 7:
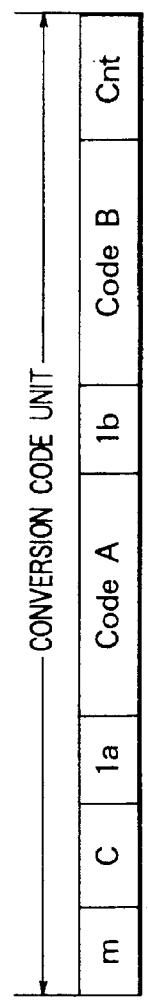
FIG. 7 is a view for use in describing a structure of a code conversion table used in the video conversion device of FIG. 6.

Turning to FIG. 7, a structure of the code conversion table will be described. The code conversion table is composed of a set of conversion code units. Each conversion code unit comprises m: the number (between 0 and 63) of processed AC components, C: a level of a lower right picture element (at a sixty-fourth position in FIG. 4 in a previous 8×8 block, 1a: the number of bits of a before converted code, CodeA: the before conversion code (an 8×8 block compression code in the differential coding system), 1b: the number of bits of a post converted code, CodeB: the post converted code (an 8×8 block compression code in the DCT coding system), and Cnt: a conversion count.

In FIG. 6, the code conversion table is prepared by the code conversion table producing circuit 11 and stored in the memory 2. The block conversion circuit 12 converts a code corresponding to a previously converted code with reference to the code conversion table stored in the memory 2.

Figure 8:
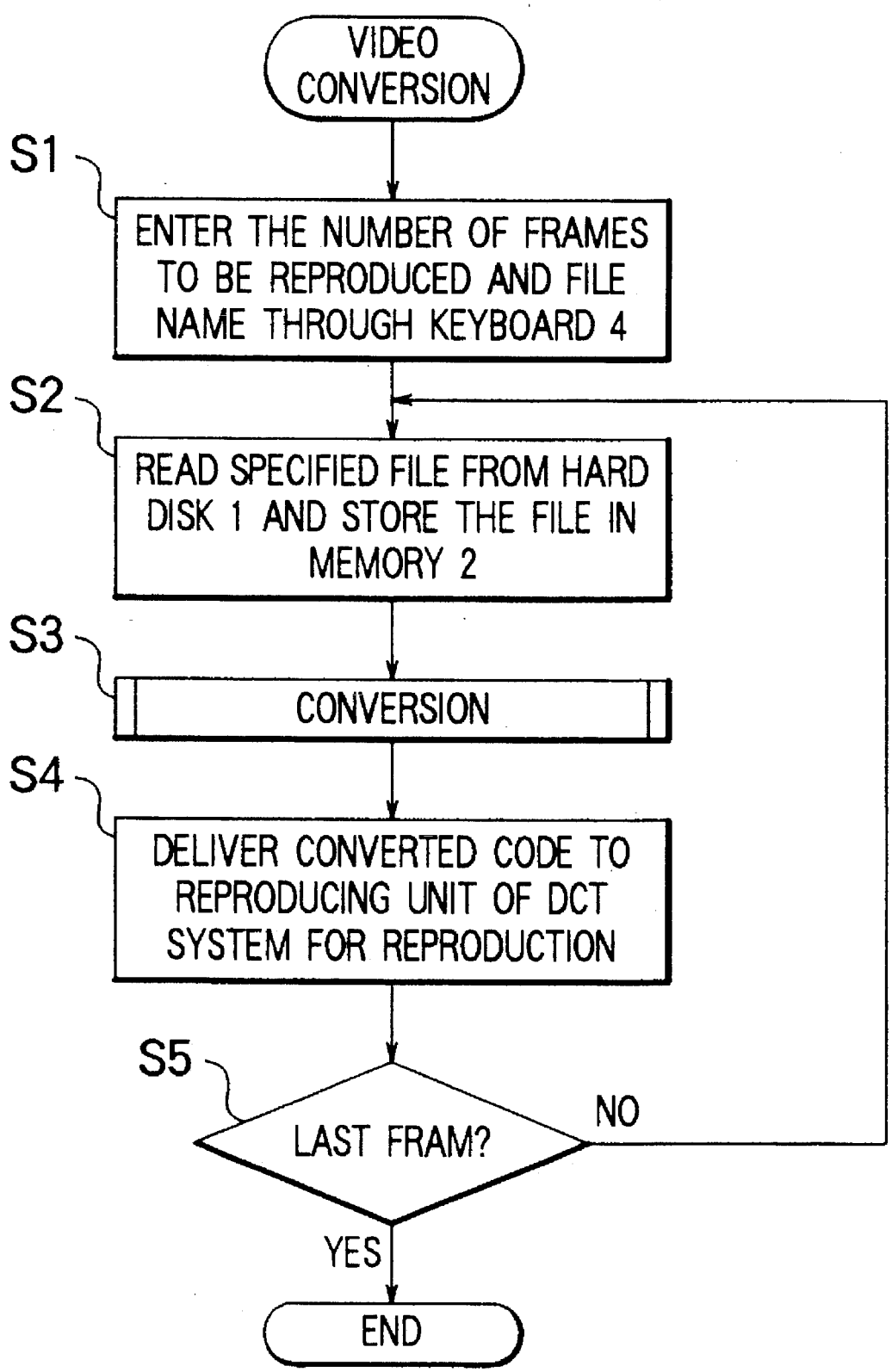
FIG. 8 is a flow chart for use in describing operation of the video conversion device of FIG. 6.

Turning to FIG. 8 with reference to FIG. 6 continued, video conversion of the video code conversion device will be described. In the video code conversion device, the number of frames to be reproduced and a file name are entered through the keyboard 4 (step S1). A specified file is read from the hard disk 1 and stored in the memory 2 (step S2). Then, conversion is carried out (step S3). Next, a converted code is delivered to the reproducing unit 20 of the DCT coding system to be reproducing (step S4). Then judgement is made whether or not the last frame of the file is dealt with (step S5). If not, the operation returns to the step S2. If so, the operation comes to an end.

Figure 9:
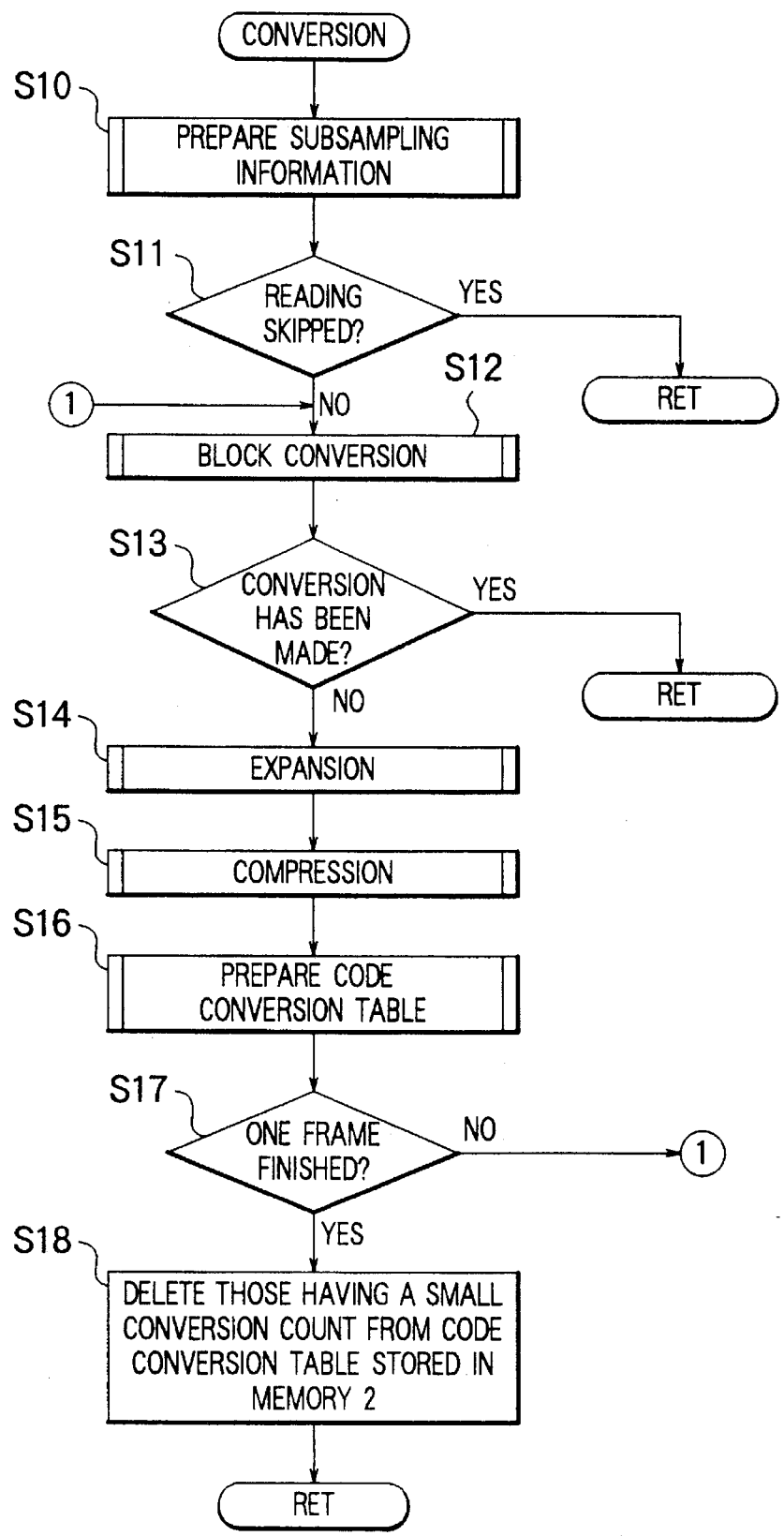
FIG. 9 is a flow chart for use in describing operation of the video conversion device of FIG. 6.

Turning to FIG. 9 with reference to FIG. 6 continued, the conversion at the step S3 of FIG. 8 will be described. To carry out video code conversion, a subsampling information preparing step calculates subsampling information for code conversion (step S10). Judgement is made whether or not reading is skipped (step S11). If so, the operation comes to an end. If not, conversion processing is carried out in a block conversion step with reference to the code conversion table (step S12). Judgement is made whether or not the conversion has been made (step S13). If so, the operation comes to an end (RET). If not, the differential code is expanded in an expansion step (step S14) and the DCT code is prepared in a compression step (step S15). Those codes before and after conversion are recorded in a code conversion table preparation step (step S16). Next, judgement is made whether or not one frame is finished (step S17). If not, the operation returns to the step S12. If so, those having a small conversion count are deleted from the code conversion table stored in the memory 2 (step S18). For example, those having a conversion count not greater than 10 or those from a smallest one to a tenth one are deleted.

In the illustrated example, those having a small conversion count are deleted so as to effectively utilize the memory 2. However, deletion is not necessary as far as the memory 2 has a large capacity.

Figure 10:
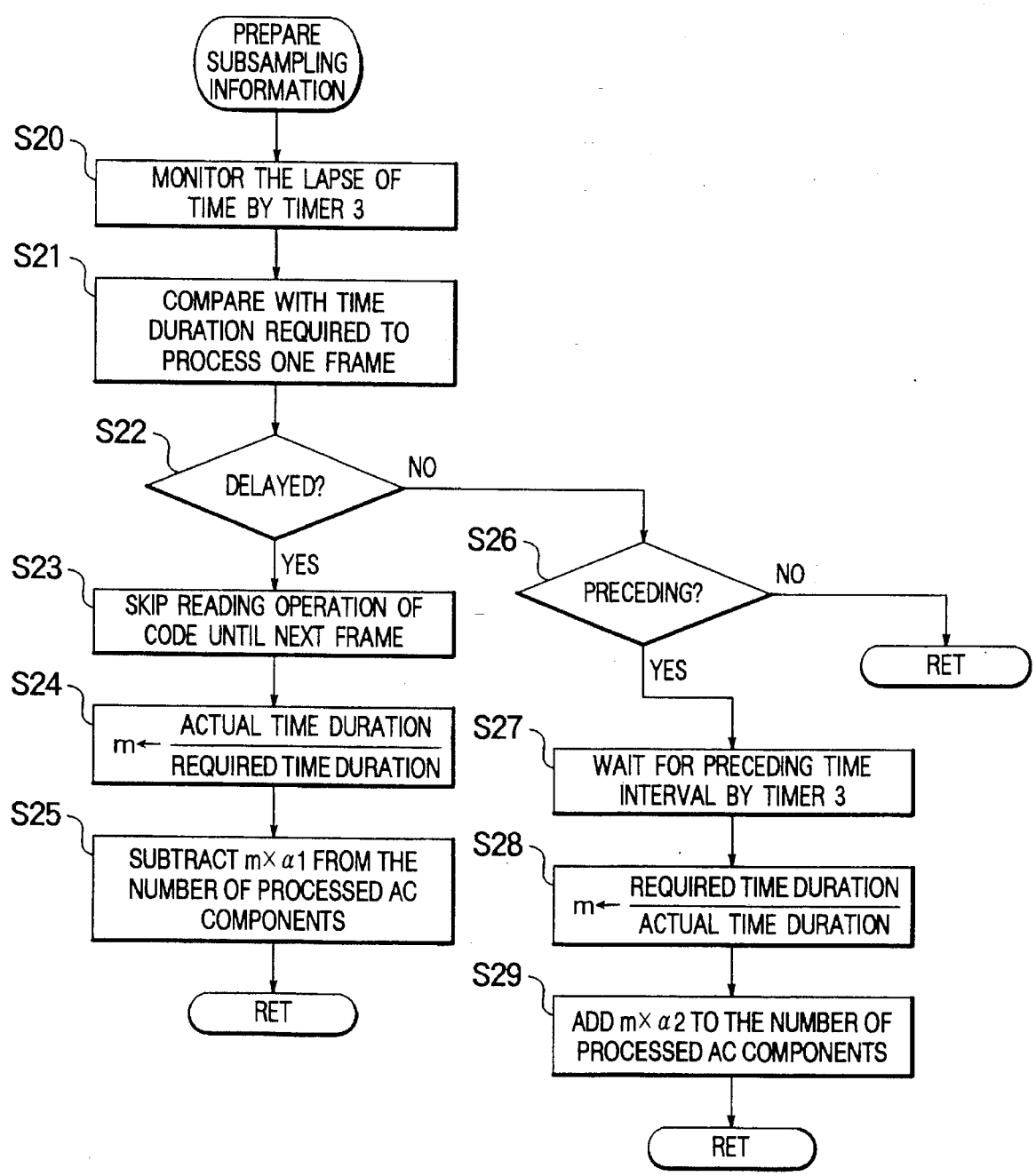
FIG. 10 is a flow chart for use in describing operation of the video conversion device of FIG. 6.

Turning to FIG. 10 with reference to FIG. 6 continued, the subsampling information preparing step at the step S10 of FIG. 9 will be described. On calculating subsampling information for code conversion in dependence upon the processing speed of the reproducing unit 20, a constant $\alpha 1$ (step S25) is preliminarily determined, through repetition of tests on several kinds of video codes, to be an optimum value for each video code conversion device. A constant $\alpha 2$ (step S29) is preliminarily determined, through repetition of tests on several kinds of video codes, to be an optimum value for each video code conversion device. In the subsampling information preparing step, the timer 3 monitors and measures the lapse of time (step S20) to be compared with a time duration required to process one frame (step S21). For example, when the frame rate is equal to 15 F/S (frames per second), the required time duration is equal to 66 milliseconds. Then, judgement is made whether or not processing of one frame is delayed (step S22). If not, the operation proceeds to the step S26. If so, code reading operation is skipped until the next frame (step S23). Then, "actual time duration/required time duration" is calculated and stored in a variable m (step S24). A product of the constant $\alpha 1$ and the variable m is calculated and subtracted from a current value of the number of processed AC components (step S25). The number of the processed AC components has an initial value equal to 63 and is determined by calculation to be a value within a range between 0 and 63. For example, it is assumed that the constant $\alpha 1$ is equal to 2, the required time duration is 66 milliseconds, the actual processing time duration is 80 milliseconds, and the current value of the number of the processed AC components is 60. In this event, calculation is given by: 2×80/66=2.42. The number of the processed AC components is subtracted by two to become equal to 58.

In the step S26, judgement is made whether or not processing of one frame precedes fast. If not, the operation comes to an end. If so, the timer 3 waits for a preceding time interval (step S27). Then, "required time duration/actual time duration" is calculated and stored in the variable m (step S28). Then, a product of the constant $\alpha 2$ and the variable m is calculated and added to the current value of the number of the processed AC component (step S29). For example, it is assumed that the constant $\alpha 2$ is equal to 2, the required time duration is 66 milliseconds, the actual processing time duration is 50 milliseconds, and the current value of the number of the processed AC components is 50. In this event, calculation is given by: 2×66/50=2.64. Accordingly, the number of the processed AC components is subtracted by two to become equal to 52.

Summarizing in FIGS. 6 and 10, the video code conversion device is supplied with a compression coded signal given by subjecting an original video signal comprising a predetermined number of frames to differential coding. The video code conversion device includes a converting section (10, 8, 7, 6) which carries out a converting operation of converting the compression coded signal into a DCT coded signal identical with a coded signal given by subjecting the original video signal to DCT coding. The device is for use in combination with a reproducing unit 20 which carries out a reproducing operation of reproducing the original video signal from the DCT coded signal. The timer 3 serves as a measuring circuit which measures a total time interval as a measured time interval until the reproducing unit 20 finishes the reproducing operation for a leading one of the frames of the original video signal from a time instant at which the converting section (10, 8, 7, 6) starts the converting operation. The subsampling information producing circuit 13 produces optimum subsampling information with reference to the measured time interval to make the converting section (10, 8, 7, 6) carry out an optimum subsampled converting operation of converting remaining ones of the frames of the compression coded signal into the DCT coded signal in accordance with the optimum subsampling information.

The subsampling information producing circuit 13 comprises a comparing section S21 which compares the measured time interval with a predetermined time interval. A first information producing section (S22, S23, S24, S25) produces, when the measured time interval is greater than the predetermined time interval, first subsampling information as the optimum subsampling information to make the converting section (10, 8, 7, 6) carry out a simplified subsampled converting operation of converting the remaining ones of the frames of the compression coded signal into the DCT coded signal in accordance with the first subsampling information.

A second information producing section (S26, S27, S28, S29) produces, when the measured time interval is less than the predetermined time interval, second subsampling information as the optimum subsampling information to make the converting section (10, 8, 7, 6) carry out a complicated subsampled converting operation of converting the remaining ones of the frames of the compression coded signal into the DCT coded signal in accordance with the second subsampling information.

Figure 11:
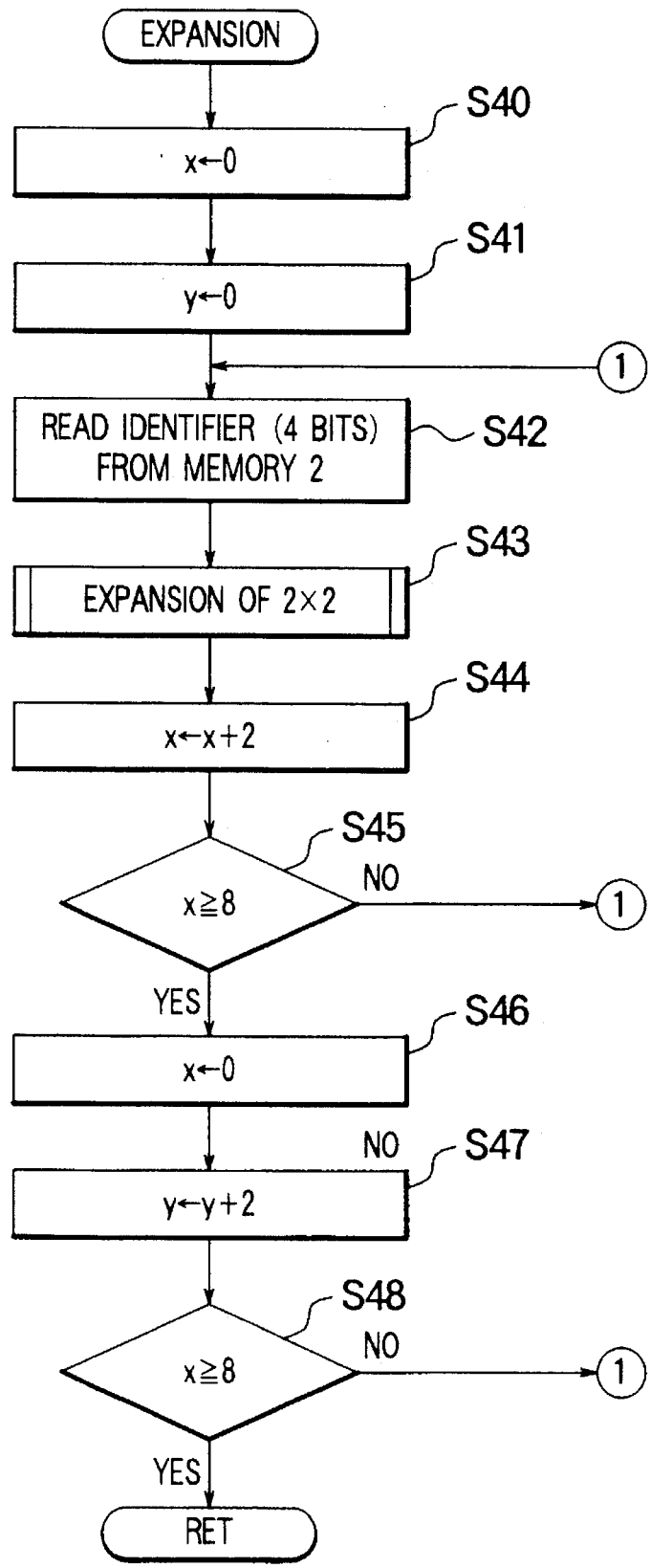
FIG. 11 is a flow chart for use in describing operation of the video conversion device of FIG. 6.

Turning to FIG. 11 with reference to FIG. 6 continued, expansion processing of the differential code at the step S14 of FIG. 9 will be described. In the expansion processing, zero is stored in a variable x (step S40). Zero is stored in a variable y (step S41). An identifier (4 bits) is read from the memory 2 (step S42). Expansion is carried out of a 2×2 block at a position depicted by x and y in a horizontal direction and in a vertical direction, respectively (step S43). Two is added to the variable x (step S44). Judgement is made whether or not the variable x is equal to or greater than 8 (step S45). If not, the operation returns to the step S42. If so, zero is stored as the variable x (step S46) and two is added to the variable y (step S47). Judgement is made whether or not the variable y is equal to or greater than 8 (step S48). If not, the operation returns to the step S42. If so, the operation comes to an end.

Figures 12, 13, 14:
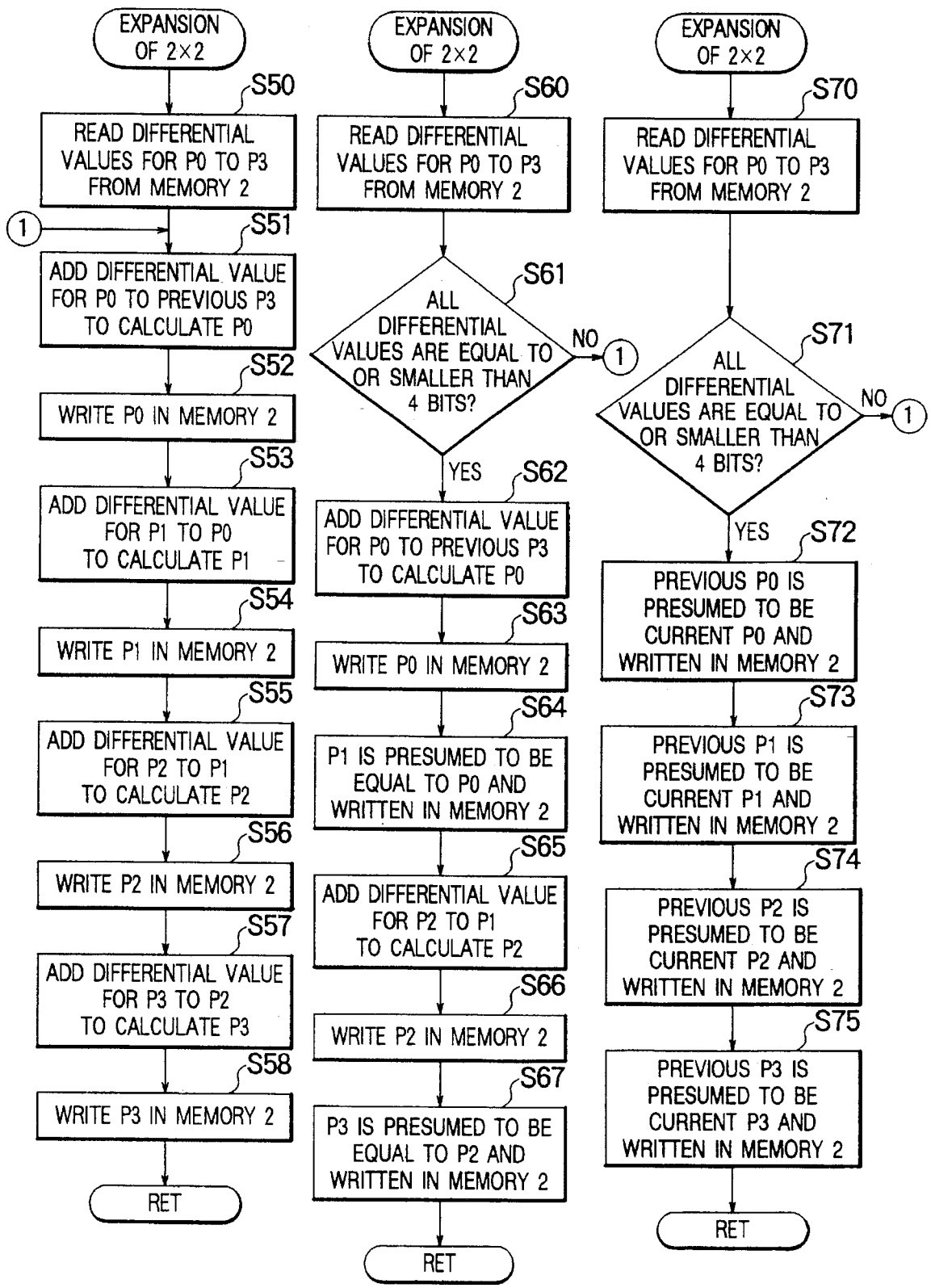
FIG. 12 is a flow chart for use in describing operation of the video conversion device of FIG. 6.
FIG. 13 is a flow chart for use in describing operation of the video conversion device of FIG. 6.
FIG. 14 is a flow chart for use in describing operation of the video conversion device of FIG. 6.

Turning to FIGS. 12 to 14 with reference to FIG. 6 continued, expansion processing at the step S43 of FIG. 11 will be described. The expansion processing of FIGS. 12 to 14 corresponds to expansion processing of a 2×2 size shown in the step SSS2 of FIG. 2. FIG. 12 depicts the processing without subsampling. FIG. 13 depicts the processing in which adjacent picture elements are presumed to have a same level if a differential value is small. FIG. 14 depicts the processing in which a picture element having a small differential value is presumed to have the same level as in the previous 2×2 block.

In the processing without subsampling as illustrated in FIG. 12, differential values dP0 to dP3 for P0 to P3 in the 2×2 block are read from the memory 2 (step S50). The differential value dP0 for P0 is added to the level of the picture element P3 in the previous 2×2 block to calculate P0 (step S51). P0 is written in the memory 2 (step S52). Then, the differential value dP1 for P1 is added to the level of P0 to calculate P1 (step S53). P1 is written in the memory 2 (step S54). Then, the differential value dP2 for P2 is added to the level of P1 to calculate P2 (step S55). P2 is written in the memory 2 (step S56). Next, the differential value dP3 for P3 is added to the level of P2 to calculate P3 (step S57). AP3 is written in the memory 2 (step S58).

As illustrated in FIG. 13, in the processing in which adjacent picture elements are presumed to have the same level if a differential value is small, the differential values dP0 to dP3 for P0 to P3 in the 2×2 block are read from the memory 2 (step S60). Judgement is made whether or not all of the differential values dP0 to dP3 are equal to or smaller than 4 bits (between 0 and 15) (step S61). If not, the operation proceeds to the step S51 in FIG. 12. If so, the differential value dP0 for P0 is added to the level of the picture element P3 in the previous 2×2 block to calculate P0 (step S62). P0 is written in the memory 2 (step S63). Next, P1 is presumed to be equal to P0 and written in the memory 2 (step S64). Then, the differential value dP2 for P2 is added to the level of P1 to calculate P2 (step S65). P2 is written in the memory 2 (step S66). Then, P3 is presumed to be equal to P2 and written in the memory 2 (step S67). Thus, calculation is skipped in the presumption that the adjacent picture elements have a same level when all of the differential values dP0 to dP3 are not greater than 4 bits. Expansion is therefore carried out at a high speed.

As illustrated in FIG. 14, in the processing in which a picture element having a small differential value is presumed to have the same level as in the previous 2×2 block, the differential values dP0 to dP3 for P0 to P3 in the 2×2 block are read from the memory 2 (step S70). Judgement is made whether or not all of the differential values dP0 to dP3 are equal to or smaller than 4 bits (between 0 and 15) (step S71). If not, the operation proceeds to the step S51 in FIG. 12. If so, in the presumption that the level of the picture element P0 is equal to that in the previous 2×2 block, the previous P0 is written in the memory 2 (step S72). Then, in the presumption that the level of the picture element P1 is equal to that in the previous 2×2 block, the previous P1 is written in the memory 2 (step S73). Subsequently, in the presumption that the level of the picture element P2 is equal to that in the previous 2×2 block, the previous P2 is written in the memory 2 (step S74). Then, in the presumption that the level of the picture element P3 is equal to that in the previous 2×2 block, the previous P3 is written in the memory 2 (step S75). Thus, when all of the differential values dP0 to dP3 are not greater than 4 bits, calculation is skipped in the assumption that the picture elements have the same levels as those in the previous 2×2 block. Accordingly, expansion is carried out at a high speed.

Figure 15:
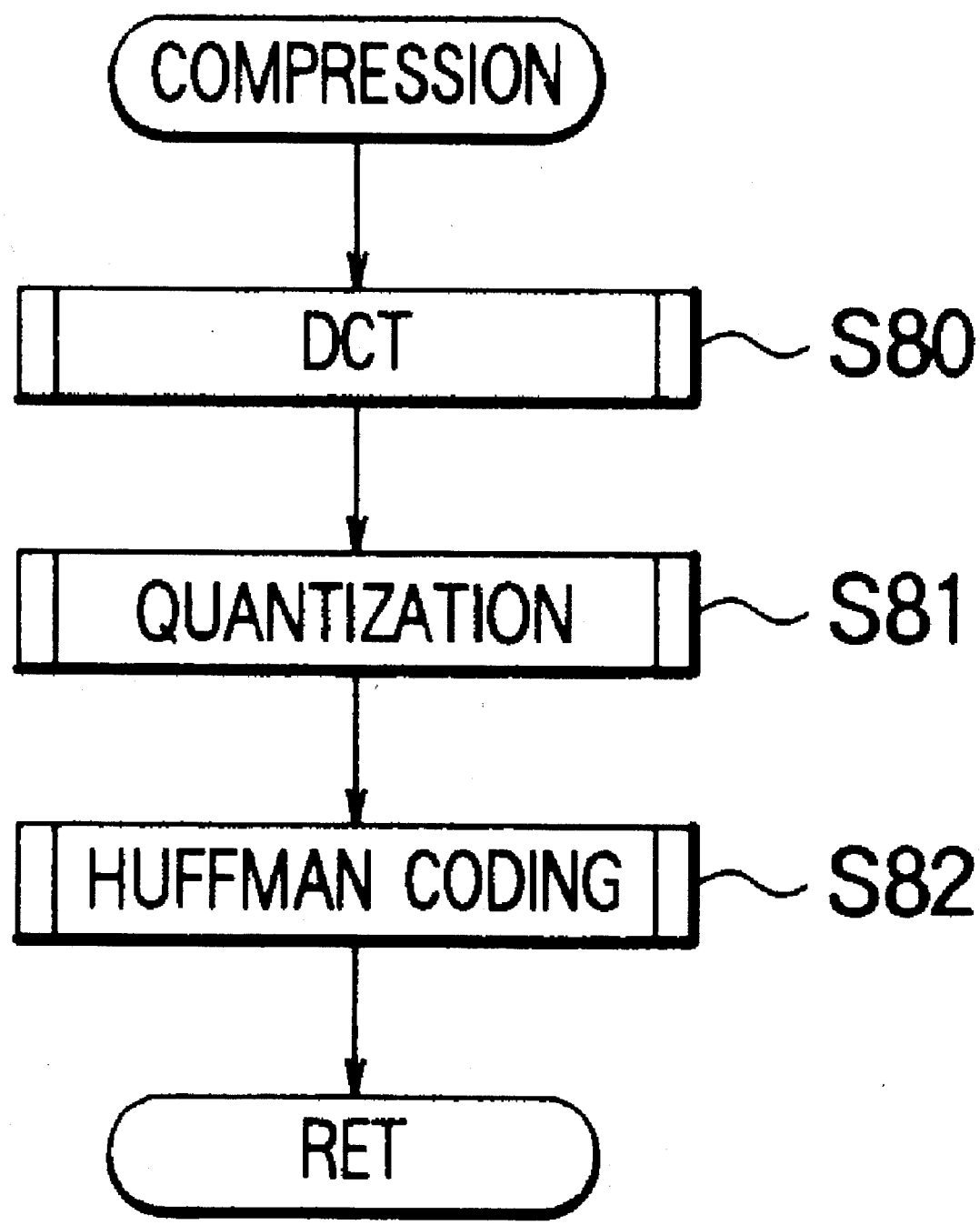
FIG. 15 is a flow chart for use in describing operation of the video conversion device of FIG. 6.

Turning to FIG. 15 with reference to FIG. 6 continued, compression processing at the step S115 of FIG. 9 will be described. On compression into the DCT code, the 8×8 block is subjected to DCT processing (step S80), quantization (step S81), and Huffman coding (step S82).

Figure 16:
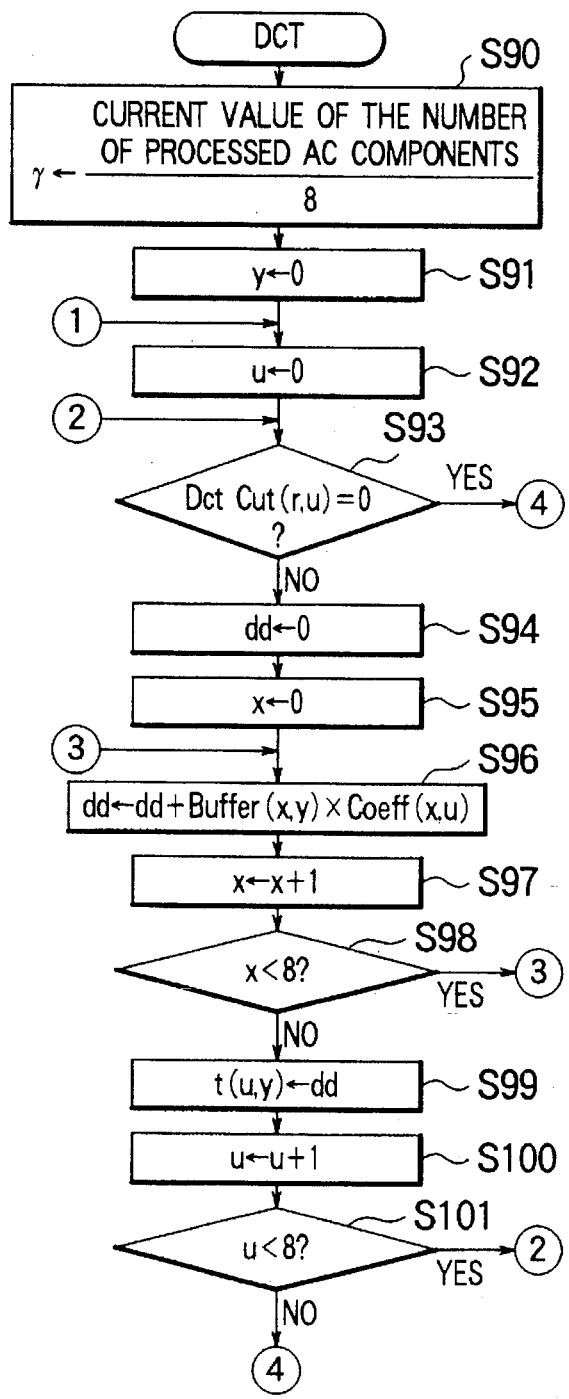
FIG. 16 is a flow chart for use in describing operation of the video conversion device of FIG. 6.
Figure 17:
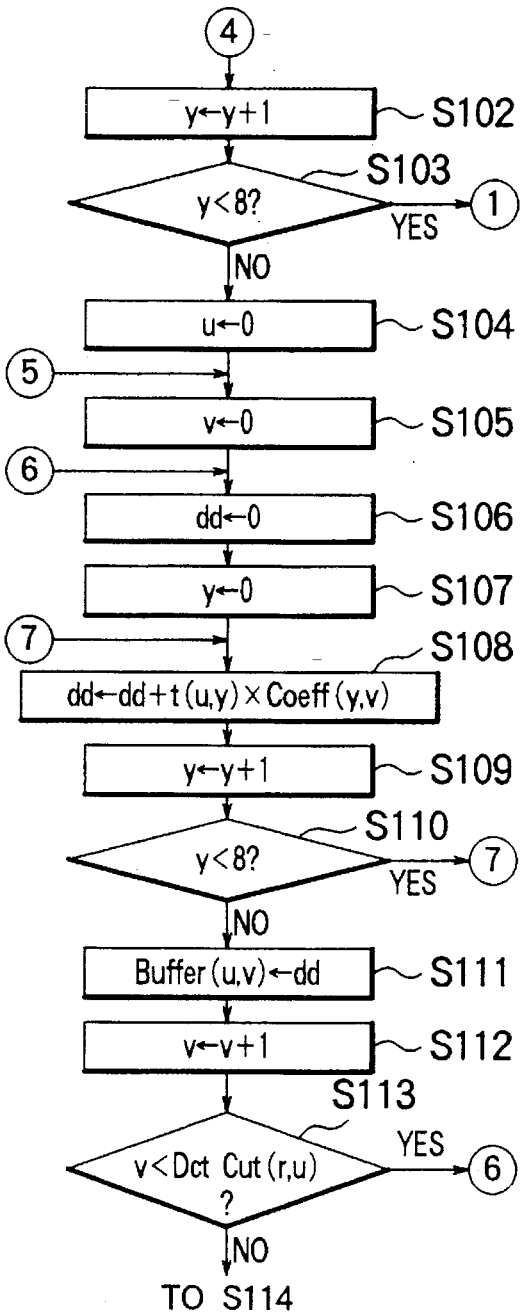
FIG. 17 is a flow chart for use in describing operation of the video conversion device of FIG. 6.
Figure 18:
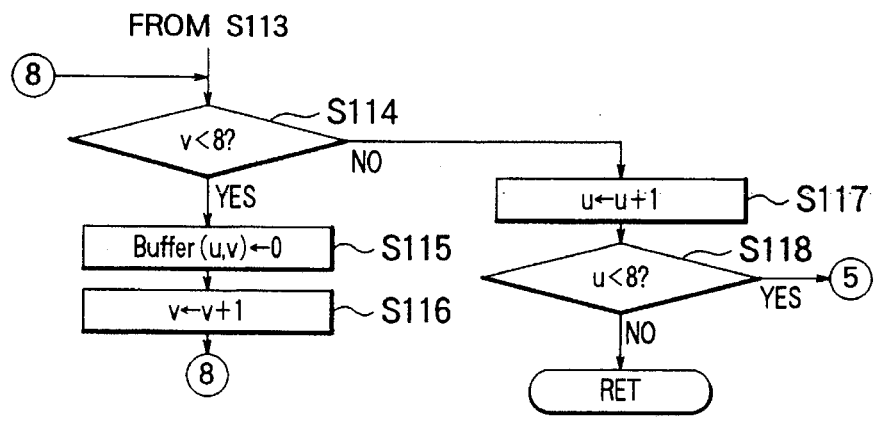
FIG. 18 is a flow chart for use in describing operation of the video conversion device of FIG. 6.

Turning to FIGS. 16 to 18 with reference to FIG. 6 continued, DCT processing at the step S80 of FIG. 15 will be described. In FIGS. 16 to 18, "DctCut" represents a constant area specifying the number of processing times per the number of the processed AC components. "Buffer" represents a variable area in which the 8×8 block data area stored. "Coeff" represents a constant area specifying DCT calculation coefficients.

In the DCT processing of FIG. 16, a current value of the number of the processed AC components/8 is calculated and stored as a variable r (step S90). Zero is stored in a variable y (step S91). Zero is stored in a variable u (step S92). Then, judgement is made whether or not DctCut (r, u) is equal to zero (step S93). If so, the operation proceeds to a step S102. If not, zero is stored in a variable dd (step S94). Zero is stored in a variable x (step S95). A product of Buffer (x, y) and Coeff(x, u) is added to the variable dd (step S96). Then, one is added to the variable x (step S97). Judgement is made whether or not the variable x is smaller than 8 (step S98). If so, the operation returns to the step S96. If not, the value of the variable dd is stored in the variable t(u, y) (step S99). Next, one is added to the variable u (step S100). Judgement is made whether or not the variable u is smaller than 8 (step S101). If so, the operation returns to the step S93.

If not, one is added to the variable y at a step S102 of FIG. 17. Judgement is made whether or not the variable y is smaller than 8 (step S103). If so, the operation returns to the step S92. If not, zero is stored in the variable u (step S104). Zero is stored in a variable v (step S105). Zero is stored in the variable dd (step S106). Zero is stored in the variable y (step S107). Next, a product of t(u, y) and Coeff(y, v) is added to the variable dd (step S108). Then, one is added to the variable y (step S109). Judgement is made whether or not the variable y is smaller than 8 (step S110). If so, the operation returns to the step S108. If not, the value of the variable dd is stored in the Buffer(u, v) (step S111). Next, one is added to the variable v (step S112). Judgement is made whether or not the variable v is smaller than DctCut(r, u) (step S113). If so, the operation returns to the step S106. If not, the operation proceeds to a step S114 in FIG. 18.

In the step S114 of FIG. 18, judgement is made whether or not the variable v is smaller than 8. If so, zero is stored in Buffer(u, v) (step S115). One is added to the variable v (step S116). Operation returns to the step S114. If not, one is added to the variable u (step S117). Judgement is made whether or not the variable u is smaller than 8 (step S118). If so, the operation returns to the step S105. If not, the operation comes to an end.

Herein:

DctCut(0, 0–7)=(3, 2, 1, 1, 0, 0, 0, 0)

DctCut(1, 0–7)=(5, 4, 3, 2, 1, 0, 0, 0)

DctCut(2, 0–7)=(7, 6, 4, 3, 2, 1, 0, 0)

DctCut(3, 0–7)=(7, 6, 5, 4, 3, 3, 2, 1)

DctCut(4, 0–7)=(8, 8, 7, 6, 4, 3, 2, 1)

DctCut(5, 0–7)=(8, 8, 7, 6, 6, 5, 4, 3)

DctCut(6, 0–7)=(8, 8, 8, 8, 7, 6, 5, 5)

DctCut(7, 0–7)=(8, 8, 8, 8, 8, 8, 8, 8)

Thus, the number of times of multiplication in the DCT processing is reduced in dependence upon the number of the processed AC components. Accordingly, the DCT processing is carried out at a high speed.

For example, the number of times of multiplication is: 8×8×8×2=1024 when all AC components are processed. When the AC components, 31 in number, are processed, the value of DctCut is (7, 6, 5, 4, 4, 3, 2, 1). In this event, the number of times of multiplication is: 8×(7+6+5+4+4+3+2+1)+8×8×4×4=512. Thus, the number of times of multiplication is reduced.

Figure 19:
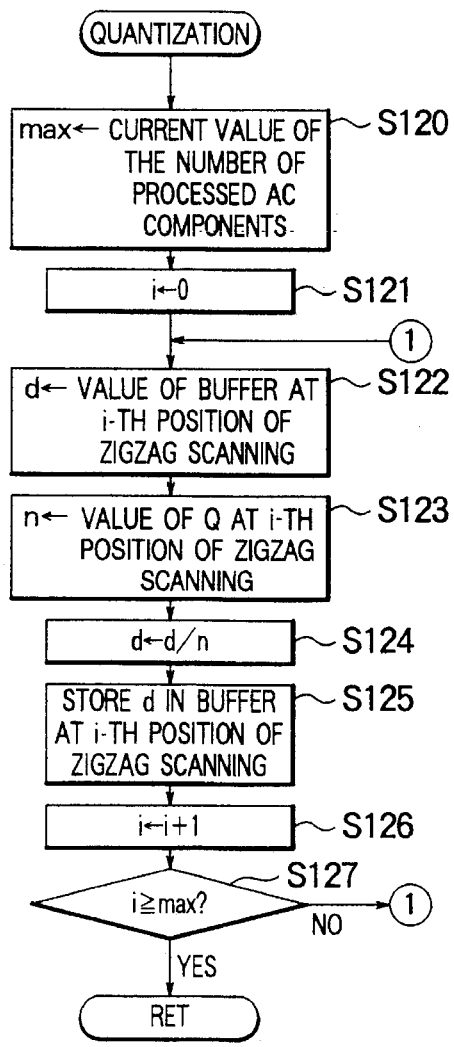
FIG. 19 is a flow chart for use in describing operation of the video conversion device of FIG. 6.

Turning to FIG. 19 with reference to FIG. 6 continued, quantization processing at the step S81 of FIG. 15 will be described. In a step S122, "Buffer" represents a variable area in which the 8×8 block data are stored. In a step S123, "Q" depicts a constant area specifying a quantization coefficient. In the quantization processing, a current value of the number of the processed AC components is stored in a variable max (step S120). Zero is stored in a variable i (step S121). The value of Buffer at an i-th position of zigzag scanning illustrated in FIG. 5 is stored in a variable d (step S122). The value of Q at the i-th position of zigzag scanning is stored in a variable n (step S123). The value of d/n is calculated and stored in the variable d (step S124). The value of the variable d is stored in Buffer at the i-th position of zigzag scanning (step S125). Then, one is added to the variable i (step S126). Judgement is made whether or not the variable i has a value not smaller than that of the variable max (step S127). If not, the operation returns to the step S122. If so, the operation comes to an end.

Thus, the number of times of multiplication in quantization is reduced in dependence upon the number of the processed AC components. Accordingly, quantization is carried out at a high speed.

Figure 20:
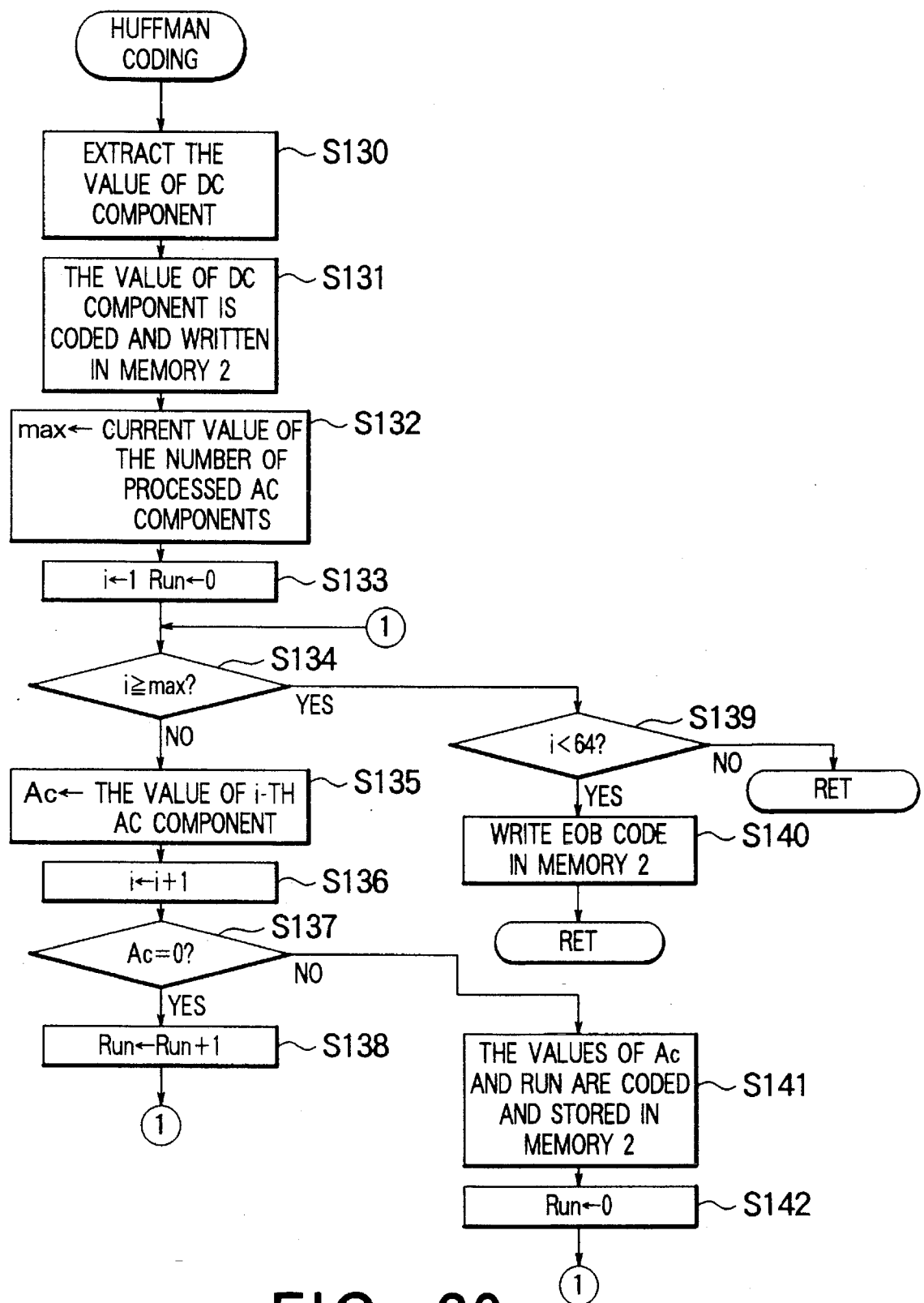
FIG. 20 is a flow chart for use in describing operation of the video conversion device of FIG. 6.

Turning to FIG. 20 with reference to FIG. 6 continued, Huffman coding of the step S82 of FIG. 5 will be described. In the Huffman coding, coding is carried out in the order of zigzag scanning illustrated in FIG. 5. As illustrated in FIG. 20, in the Huffman coding, the value of a DC component (at the first position of zigzag scanning) is extracted from the 8×8 block (step S130). The value of the DC component is coded and written in the memory 2 (step S131). Next, a current value of the number of the processed AC components is stored in the variable max (step S132). One is stored in the variable i and zero is stored in a variable Run (step S133). Then, judgement is made whether or not the variable i has a value not smaller than that of the variable max (step S134). If so, the operation proceeds to a step S139. If not, the value of the i-th AC component is stored in a variable Ac (step S135). One is added to the variable i (step S136). Judgement is made whether or not the variable Ac is equal to zero. If so, one is added to the variable Run (step S138) and the operation returns to the step S134. If not, a combination of the variable Ac and the variable Run is coded and stored in the memory 2 (step S141). Zero is stored in the variable Run (step S142). The operation returns to the step S134. In the step S139, judgement is made whether or not the variable i is smaller than 64 (step S139). If not, the operation comes to an end. If so, an EOB (End of Block) code indicative of completion of coding of the block is written in the memory 2 (step S140).

Thus, the number of times of coding in the Huffman coding is reduced in dependence upon the number of the processed AC components. Accordingly, the Huffman coding is carried out at a high speed.

Figure 21:
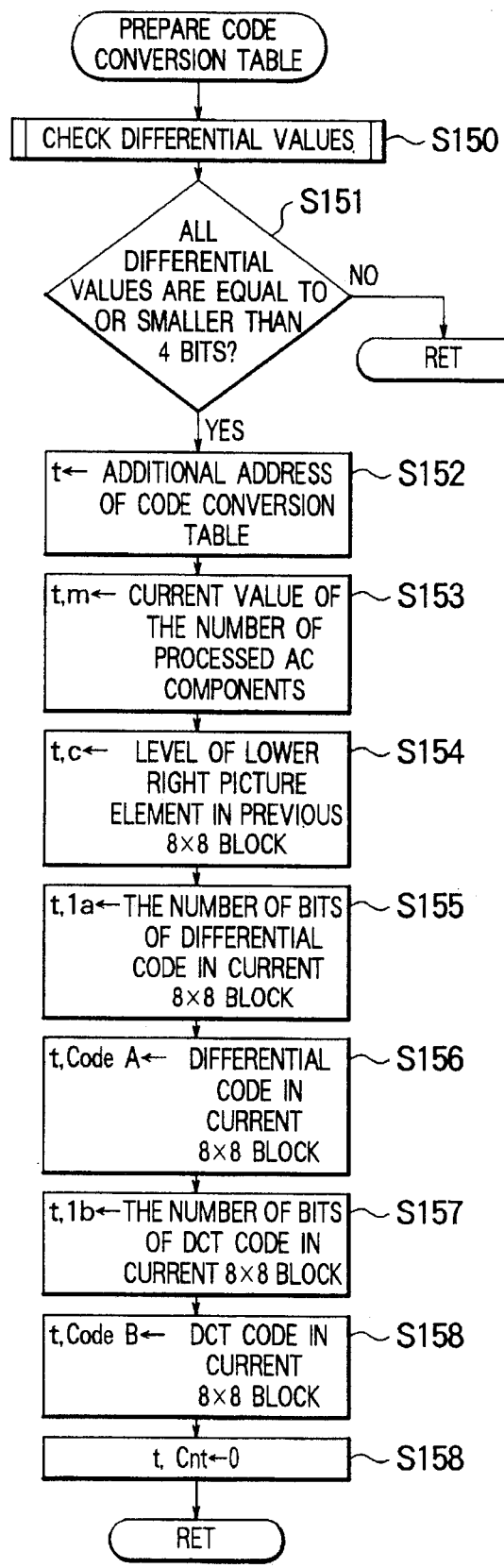
FIG. 21 is a flow chart for use in describing operation of the video conversion device of FIG. 6.

Turning to FIG. 21, description will proceed to code conversion table preparing processing of the code conversion table producing circuit 11 (FIG. 6) at the step S16 of FIG. 9. In the code conversion table preparing processing, the code conversion table illustrated in FIG. 7 is prepared. In FIGS. 21 and 7, in order to prepare the code conversion table, the differential values are checked (step S150). Judgement is made whether or not all of the differential values are equal to or smaller than 4 bits (between 0 and 15) (step S151). If not, the operation comes to an end. If so, an additional address of the code conversion table is stored in a variable t (step S152). A current value of the number of the processed AC components is stored in a variable t,m (step S153). The level of the picture element at a lower right position (at a 64-th position in FIG. 4) in the previous 8×8 block is stored in a variable t,C (step S154). The number of bits of the differential codes in the current 8×8 block is stored in a variable t,1a (step S155). The differential codes in the current 8×8 block are stored in a variable t,CodeA (step S156). Then, the number of bits of the DCT codes in the current 8×8 block is stored in a variable t,1b (step S157). The DCT codes in the current 8×8 block are stored in a variable t,CodeB (step S158). Zero is stored in a variable t,Cnt (step S159).

In FIG. 21, in order to effectively utilize the memory 2, the code conversion table is prepared only in case where all of the differential values of the differential codes are not greater than 4 bits. However, if the memory 2 has a large capacity, the code conversion table may be prepared for all codes.

Figure 22:
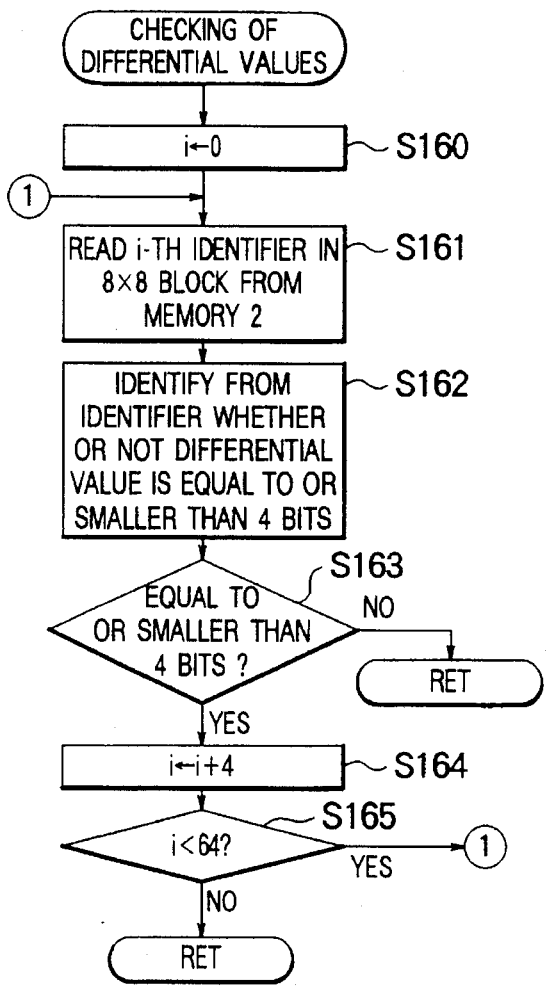
FIG. 22 is a flow chart for use in describing operation of the video conversion device of FIG. 6.

Referring to FIG. 22 in addition to FIGS. 6 and 7, checking operation of the differential values at the step S150 of FIG. 21 will be described. The checking operation of the differential values is carried out as follows. Zero is stored in the variable i (step S160). An i-th identifier in the 8×8 block is read from the memory 2 in the order illustrated in FIG. 4 (step S161). With reference to the identifier, identification is carried out whether or not the differential value is equal to or smaller than 4 bits (between 0 and 15) (step S162). Judgement is made whether or not the value is equal to or smaller than 4 bits (step S163). If not, the operation comes to an end. If so, four is added to the variable i (step S164). Identification is carried out whether or not the variable i is smaller than 54 (step S165). If so, the operation returns to the step S161.

Figure 23:
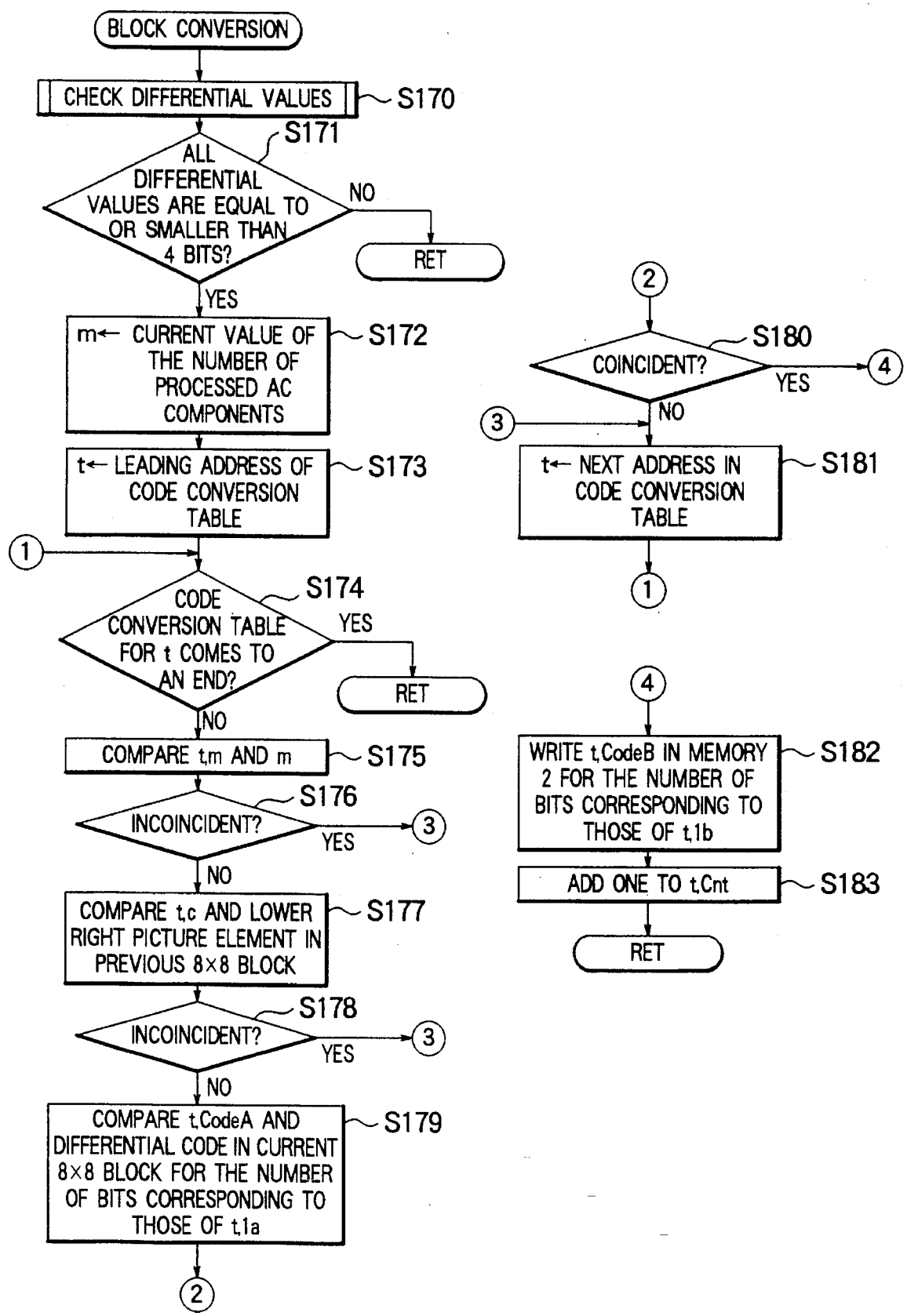
FIG. 23 is a flow chart for use in describing operation of the video conversion device of FIG. 6.

Turning to FIG. 23 with reference to FIGS. 6 and 7, block conversion processing of the block conversion circuit 12 at the step S12 of FIG. 9 will be described. In the block conversion processing, the code conversion is carried out at a high speed with reference to the code conversion table prepared in the code conversion table preparation processing. To carry out block conversion, the differential values are checked (step S170). Judgement is made whether or not all of the differential values are equal to or smaller than 4 bits (between 0 and 15) (step S171). If not, the operation comes to an end. If so, a current value of the number of the processed AC components is stored in the variable m (step S172). A leading address in the code conversion table is stored in the variable t (step S173). Judgement is made whether or not the address in the variable t is the last address in the code conversion table (step S174). If so, the operation comes to an end. If not, comparison is made between the variable t,m and the variable m to judge incoincidence (step S176). If so, the operation proceeds to the step S181. If not, comparison is made between the variable t,C and the picture element at a lower right position (at a 64-th position in FIG. 4) in the previous 8×8 block (step S177). Judgement is made of incoincidence (step S178). If so, the operation proceeds to the step S181. If not, comparison is made between the variable t,CodeA and the differential codes in the current 8×8 block before conversion with respect to the number of bits corresponding to that of the variable t,1a (step S179). Judgement is made of coincidence (step S180). If so, the operation proceeds to the step S182. If not, the next address in the code conversion table is stored in the variable t (step S181). The operation returns to the step S174. In the step S182, the variable t,CodeB is written in the memory 2 for the number of bits corresponding to that of the variable t,1b (step S182). One is added to the variable t,Cnt (step S183).

In FIG. 23, in order to effectively utilize the memory 2, the code conversion table is referred to only in case where all of the differential values of the differential codes are not greater than 4 bits. If the memory 2 has a large capacity, the code conversion table may be prepared for all codes and referred to.

As described above, the video code conversion device of FIG. 6 of this invention includes the subsampling information producing circuit 13 for calculating the subsampling information corresponding to the processing ability (or a reproducing speed) of the reproducing unit 20 and for making the video code conversion device carry out code conversion at an optimum conversion speed which matches the reproducing speed of the reproducing unit 20. As a result, the code conversion is carried out at a high speed without decreasing a picture quality in correspondence to the processing speed of the reproducing unit 20. Any reproducing unit can carry out realtime reproduction with an optimum picture quality.

What is claimed is:

1. A video code conversion device which is supplied with a compression coded signal given by subjecting an original video signal comprising a predetermined number of frames to differential coding and which includes converting means for carrying out a converting operation of converting said compression coded signal into a DCT coded signal identical with a coded signal given by subjecting said original video signal to DCT coding, said video code conversion device being for use in combination with a reproducing unit for carrying out a reproducing operation of reproducing said original video signal from said DCT coded signal, said device comprising:

measuring means for measuring a total time interval as a measured time interval until said reproducing unit finishes the reproducing operation for a leading one of the frames of said original video signal from a time instant at which said converting means starts said converting operation; and subsampling information producing means for producing optimum subsampling information with reference to said measured time interval to make said converting means carry out a optimum subsampled converting operation of converting remaining ones of the frames of said compression coded signal into said DCT coded signal in accordance with said optimum subsampling information.

2. A video code conversion device as claimed in claim 1, said converting means comprising expanding means for expanding said compression coded signal into an expanded signal, DCT means for DCT processing said expanded signal into a DCT processed signal, quantizing means for quantizing said DCT processed signal into a quantized signal, and Huffman coding means for Huffman coding said quantized signal into a Huffman coded signal which is for use as said DCT coded signal, wherein:

said subsampling information producing means makes at least one of said expanding means, said DCT means, said quantizing means, and said Huffman coding means carry out said optimum subsampled converting operation in accordance with said optimum subsampling information on converting the remaining ones of the frames of said compression coded signal into said DCT coded signal.

3. A video code conversion device as claimed in claim 1, wherein said subsampling information producing means comprises:

comparing means for comparing said measured time interval with a predetermined time interval; and first information producing means for producing, when said measured time interval is greater than said predetermined time interval, first subsampling information as said optimum subsampling information to make said converting means carry out a simplified subsampled converting operation of converting the remaining ones of the frames of said compression coded signal into said DCT coded signal in accordance with said first subsampling information.

4. A video code conversion device as claimed in claim 3, wherein said subsampling information producing means further comprises:

second information producing means for producing, when said measured time interval is less than said predetermined time interval, second subsampling information as said optimum subsampling information to make said converting means carry out a complicated subsampled converting operation of converting the remaining ones of the frames of said compression coded signal into said DCT coded signal in accordance with said second subsampling information.

5. A video code conversion device as claimed in claim 3, said converting means comprising expanding means for expanding said compression coded signal into an expanded signal, DCT means for DCT processing said expanded signal into a DCT processed signal, quantizing means for quantizing said DCT processed signal into a quantized signal, and Huffman coding means for Huffman coding said quantized signal into a Huffman coded signal which is for use as said DCT coded signal, wherein:

said first information processing means makes at least one of said expanding means, said DCT means, said quantizing means, and said Huffman coding means carry out said simplified subsampled converting operation in accordance with said first subsampling information on converting the remaining ones of the frames of said compression coded signal into said DCT coded signal.

6. A video code conversion device as claimed in claim 5, wherein:

said at least one of said expanding means, said DCT means, said quantizing means, and said Huffman coding means is said expanding means;

said expanding means carrying out said simplified subsampled converting operation in accordance with said first subsampling information so that said compression coded signal is expanded into said expanded signal in the assumption that, in a block comprising N×N (N being an integer not smaller than two) picture elements of said compression coded signal, adjacent picture elements have an identical level.

7. A video code conversion device as claimed in claim 5, wherein:

said at least one of said expanding means, said DCT means, said quantizing means, and said Huffman coding means is said expanding means;

said expanding means carrying out said simplified subsampled converting operation in accordance with said first subsampling information so that said compression coded signal is expanded into said expanded signal in the assumption that, in a block comprising N×N (N being an integer not smaller than two) picture elements of said compression coded signal, those picture elements having differential values not greater than a predetermined level have a zero level.

8. A video code conversion device as claimed in claim 5, wherein:

said at least one of said expanding means, said DCT means, said quantizing means, and said Huffman coding means is said DCT means;

said DCT means carrying out said simplified subsampled converting operation in accordance with said first subsampling information so that said expanded signal is DCT processed into said DCT processed signal with omission of DCT processing for high-frequency components of picture elements in a block comprising N×N (N being an integer not smaller than two) picture elements of said expanded signal.

9. A video code conversion device as claimed in claim 5, wherein:

said at least one of said expanding means, said DCT means, said quantizing means, and said Huffman coding means is said quantizing means;

said quantizing means carrying out said simplified subsampled converting operation in accordance with said first subsampling information so that said DCT processed signal is quantized into said quantized signal with omission of quantization for high-frequency components of picture elements in a block comprising N×N (N being an integer not smaller than two) picture elements of said DCT processed signal.

10. A video code conversion device as claimed in claim 5, wherein:

said at least one of said expanding means, said DCT means, said quantizing means, and said Huffman coding means is said Huffman coding means;

said Huffman coding means carrying out said simplified subsampled converting operation in accordance with said first subsampling information so that said quantized signal is Huffman coded into said Huffman coded signal with omission of Huffman coding for high-frequency components of picture elements in a block comprising N×N (N being an integer not smaller than two) picture elements of said quantized signal.

11. A video code conversion device as claimed in claim 1, further comprising:

code conversion table producing means for producing, when said compression coded signal is converted into said DCT coded signal, a code conversion table for conversion of said compression coded signal into said DCT coded signal for each block comprising N×N (N being an integer not smaller than two) picture elements of said compression coded signal; and code conversion means for carrying out code conversion with reference to said code conversion table.

\* \* \* \* \*